US011972616B2

(12) United States Patent
Mayster et al.

(10) Patent No.: US 11,972,616 B2
(45) Date of Patent: Apr. 30, 2024

(54) ENHANCED NAVIGATION INSTRUCTIONS WITH LANDMARKS UNDER DIFFICULT DRIVING CONDITIONS

(71) Applicant: Google LLC, Mountain View, CA (US)

(72) Inventors: Yan Mayster, Aurora, CO (US); Brian Edmond Brewington, Superior, CO (US)

(73) Assignee: Google LLC, Mountain View, CA (US)

( * ) Notice: Subject to any disclaimer, the term of this patent is extended or adjusted under 35 U.S.C. 154(b) by 623 days.

(21) Appl. No.: 16/617,902

(22) PCT Filed: Jan. 9, 2019

(86) PCT No.: PCT/US2019/012884
§ 371 (c)(1),
(2) Date: Nov. 27, 2019

(87) PCT Pub. No.: WO2020/106309
PCT Pub. Date: May 28, 2020

(65) Prior Publication Data
US 2020/0349368 A1 Nov. 5, 2020

Related U.S. Application Data

(60) Provisional application No. 62/769,646, filed on Nov. 20, 2018.

(51) Int. Cl.
*G06V 20/58* (2022.01)
*G01C 21/36* (2006.01)
(52) U.S. Cl.
CPC ....... *G06V 20/582* (2022.01); *G01C 21/3602* (2013.01); *G01C 21/3644* (2013.01)
(58) Field of Classification Search
CPC .................. G01C 21/3644; G01C 21/3602
See application file for complete search history.

(56) References Cited

U.S. PATENT DOCUMENTS 6,078,865 A * 6/2000 Koyanagi .......... G01C 21/3644
340/988
8,417,448 B1 * 4/2013 Denise ............... G01C 21/3484
701/410
(Continued)

FOREIGN PATENT DOCUMENTS

CN 103339010 A 10/2013
DE 102009019702 A1 * 11/2009 ............ B60W 50/08
(Continued)

OTHER PUBLICATIONS

Office Action for Korean Patent Application No. 10-2020-7031613 dated Apr. 26, 2022. 7 pages.
(Continued)

*Primary Examiner* — Vivek D Koppikar
*Assistant Examiner* — Godfrey Aleksander Maciorowski
(74) *Attorney, Agent, or Firm* — Lerner David LLP

(57) ABSTRACT

The technology relates to factors regarding the external environment around a vehicle that are used to trigger enhanced driving directions for use by the driver. The factors can include issues such as adverse weather conditions, low light conditions and temporary obstacles or other obstructions that may prevent or reduce the ability of the driver to see street signs or other landmarks that are part of an initial set of driving directions. Upon determination of one or more relevant factors, the system is able to modify or otherwise enhances directions in real time. This allows the driver to be able to quickly and easily identify other visible landmarks and use such information to navigate to a desired destination. This approach employs one or more on-board cameras configured to detect objects and conditions in the environment adjacent to or otherwise nearby the vehicle, such as within line of sight of the vehicle's front end.

22 Claims, 13 Drawing Sheets

(56) References Cited

U.S. PATENT DOCUMENTS

| | | | |
|---|---|---|---|
| 8,688,377 B1* | 4/2014 | Urbach | G01C 21/30 |
| | | | 701/425 |
| 9,915,947 B1* | 3/2018 | LaForge | G05D 1/0077 |
| 2002/0191833 A1* | 12/2002 | Kim | G01N 21/95607 |
| | | | 382/218 |
| 2006/0244830 A1* | 11/2006 | Davenport | B61L 25/021 |
| | | | 348/148 |
| 2008/0319659 A1* | 12/2008 | Horvitz | G09B 29/106 |
| | | | 701/33.4 |
| 2010/0176987 A1* | 7/2010 | Hoshizaki | G01S 19/485 |
| | | | 707/E17.108 |
| 2010/0250126 A1* | 9/2010 | Epshtein | G01C 21/3602 |
| | | | 701/438 |
| 2011/0178697 A1* | 7/2011 | Mincey | G01C 21/3644 |
| | | | 701/532 |
| 2013/0261969 A1* | 10/2013 | Nakamura | G06T 11/00 |
| | | | 701/533 |
| 2014/0005922 A1* | 1/2014 | Bank | G01C 21/3641 |
| | | | 701/423 |
| 2014/0372020 A1* | 12/2014 | Stein | G01C 21/3602 |
| | | | 701/410 |
| 2015/0025731 A1* | 1/2015 | Uehara | B60W 50/14 |
| | | | 701/23 |
| 2015/0141043 A1* | 5/2015 | Abramson | G01C 21/34 |
| | | | 455/456.1 |
| 2016/0216130 A1* | 7/2016 | Abramson | G01C 21/3423 |
| 2017/0314954 A1* | 11/2017 | Golding | G01C 21/3644 |
| 2017/0325443 A1* | 11/2017 | Crinklaw | G05D 1/0274 |
| 2018/0052457 A1* | 2/2018 | Kim | H04N 13/239 |
| 2018/0136001 A1* | 5/2018 | Ishikawa | G06F 18/22 |
| 2018/0374346 A1* | 12/2018 | Fowe | G08G 1/0129 |

FOREIGN PATENT DOCUMENTS

| | | | | |
|---|---|---|---|---|
| DE | 102016205866 A1 | 10/2017 | | |
| JP | 2009012717 A | 1/2009 | | |
| JP | 4881493 B1 * | 2/2012 | | G01C 21/3602 |
| WO | WO-2009002884 A2 * | 12/2008 | | G01C 21/3476 |
| WO | WO-2010081549 A1 * | 7/2010 | | G01C 21/3644 |

OTHER PUBLICATIONS

International Search Report and Written Opinion for International Application No. PCT/US2019/012884 dated Oct. 14, 2019. 20 pages.
Invitation to Pay Additional Fees, Communication Relating to the Results of the Partial International Search, and Provisional Opinion for International Application No. PCT/US2019/012884 dated Aug. 22, 2019. 14 pages.
First Examination Report for Indian Patent Application No. 20202704084 dated Apr. 28, 2022. 7 pages.
Office Action for Japanese Patent Application No. 2020-567025 dated Nov. 22, 2021. 4 pages.
Decision of Rejection for Japanese Patent Application No. 2020-567025 dated Jul. 11, 2022. 5 pages.
Office Action for European Patent Application No. 19702738.6 dated Jun. 5, 2023. 11 pages.
Office Action for Chinese Patent Application No. 201980026974.8 dated Sep. 26, 2023. 14 pages.
International Preliminary Report on Patentability for International Application No. PCT/US2019/012884 dated Jun. 3, 2021. 13 pages.
Office Action for Japanese Patent Application No. 2022-181133 dated Nov. 27, 2023. 4 pages.

* cited by examiner

100

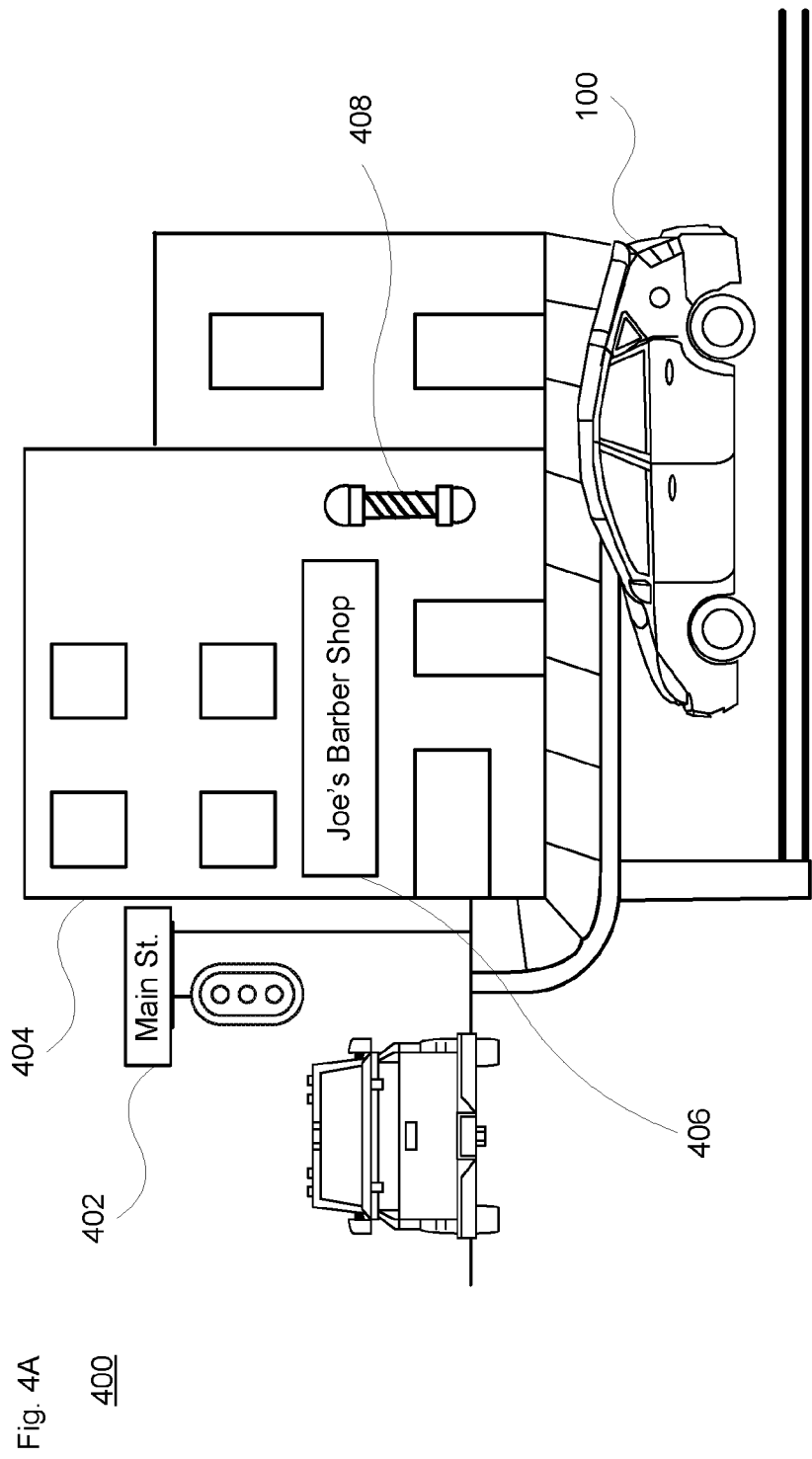

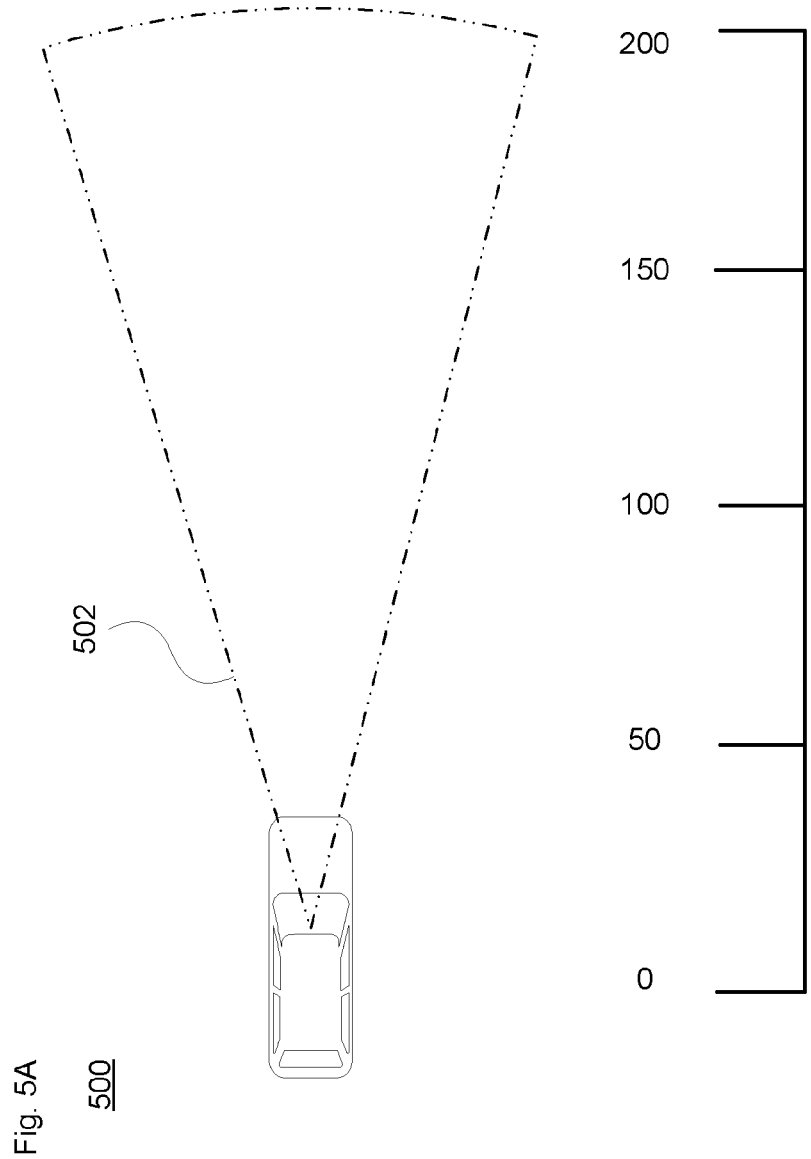

600

700

ENHANCED NAVIGATION INSTRUCTIONS WITH LANDMARKS UNDER DIFFICULT DRIVING CONDITIONS

CROSS-REFERENCE TO RELATED APPLICATIONS

The present application claims the benefit of the filing date of U.S. Provisional Application No. 62/769,646, filed Nov. 20, 2018, entitled Enhanced Navigation Instructions with Landmarks Under Difficult Driving Conditions, the disclosure of which is hereby incorporated herein by reference.

BACKGROUND

Map navigation systems are used in many different situations, including when providing driving or walking directions to a user. In the case of driving, the navigation system can adapt to current traffic conditions to alter the route based on the knowledge of traffic jams or accidents. This information may be received from third party reports, e.g., crowdsourced from other drivers, local transit authorities, etc. However, there may be real-time environmental and other factors that can also impact the trip. This may include, for instance, weather, road construction/lane work, low-light conditions due to the time of day, and other factors. The conditions relating to such factors may limit the ability of the user, such as a driver, from properly following a set of driving directions.

BRIEF SUMMARY

Aspects of the technology relate to factors that trigger enhanced driving directions, such as adverse weather conditions. Upon determination of one or more relevant factors, the system modifies or otherwise enhances directions in real time, so that the driver is able to quickly and easily identify different landmarks and use the enhanced information to navigate to a desired destination. For instance, as discussed in detail below, an on-board camera is configured to detect objects and conditions in the environment adjacent or otherwise nearby the vehicle, such as within line of sight of the front of the vehicle. Such real-time environmental information is analyzed, and when it is determined that the environmental information may adversely impact the ability of the driver to follow existing directions, enhanced directions are provided to more easily enable the driver to correctly follow a particular route.

According to one aspect, a method comprises obtaining initial directions for a driving route for a driver of a vehicle, the directions for use in routing the vehicle from a starting point to a destination; obtaining previously captured imagery of one or more locations along the route; identifying a first landmark located in the previously captured imagery; receiving, by one or more processors of a computer device, real-time imagery obtained by a camera located in the vehicle; comparing, by the one or more processors, at least one image from the real-time imagery against at least one image from the previously captured imagery to determine whether the first landmark would be observable by the driver of the vehicle; and modifying by the one or more processors, upon a determination that the first landmark would not be observable by the driver of the vehicle, the initial directions for the driving route to indicate at least one other landmark different than the first landmark.

In one example, the comparing to determine whether the first landmark would be observable by the driver of the vehicle includes determining whether the first landmark is partially or fully obscured from viewing by the driver of the vehicle. Here, determining whether the first landmark is partially or fully obscured may include determining that visibility of the first landmark is adversely impacted by a weather condition, a low light condition, another vehicle, a building or vegetation. The real-time imagery may be obtained by the camera during driving along the route. The modified directions may indicate to the driver to take a specific driving action when the at least one other landmark is visible to the driver. Here, the specific driving action may be selected from a group consisting of slowing down, turning, stopping or parking.

Modifying the initial directions may include at least one of updating a graphical display within the vehicle or playing audible instructions within the vehicle. The camera located in the vehicle has a field of view, and comparing the at least one image from the real-time imagery against the at least one image from the previously captured image may include evaluating the camera's field of view against an expected field of view of the driver. And modifying the initial directions may include augmenting or replacing the initial directions with at least one visual clue based on one or more objects along the driving route visible to the camera.

According to another aspect, a method comprises receiving, by one or more processors of a computer device, real-time imagery obtained by a camera located in a vehicle during driving of the vehicle by a driver; analyzing, by the one or more processors, at least one image from the real-time imagery to determine a current condition in an external environment around the vehicle; determining by the one or more processors, based on the analyzing, that the current condition is expected to obscure a selected landmark in the external environment from viewing by the driver; upon determining that the current condition is expected to obscure the selected landmark in the external environment from viewing by the driver, identifying by the one or more processors a different landmark that is observable by the camera located in the vehicle; and providing a visual, audible or haptic indication of the different landmark to the driver.

The method may comprise, prior to the providing, modifying an initial set of directions for driving to a destination with the indication of the different landmark. The modified initial directions may indicate to the driver to take a specific driving action when the different landmark is visible to the driver. The specific driving action may be selected from a group consisting of slowing down, turning, stopping or parking.

Determining that the current condition is expected to obscure the selected landmark in the external environment from viewing by the driver may include determining that visibility of the selected landmark is adversely impacted by a weather condition, a low light condition, another vehicle, a building or vegetation. And analyzing the at least one image from the real-time imagery to determine the current condition in the external environment around the vehicle may comprise applying a machine learning model to the real-time imagery in order to detect an obstructions or other visibility impairment in the external environment.

According to a further aspect, a system comprises memory configured to store at least one of instructions or data and one or more processors operatively coupled to the memory. The one or more processors are configured to obtain initial directions for a driving route for a driver of a vehicle, the directions for use in routing the vehicle from a starting point to a destination; obtain previously captured imagery of one or more locations along the route; identify a first landmark located in the previously captured imagery; receive real-time imagery obtained by a camera located in the vehicle; compare at least one image from the real-time imagery against at least one image from the previously captured imagery to determine whether the first landmark would be observable by the driver of the vehicle; and modify, upon a determination that the first landmark would not be observable by the driver of the vehicle, the initial directions for the driving route to indicate at least one other landmark different than the first landmark.

In one example, the system further comprises the camera. The camera may be part of a personal communication device.

According to yet another aspect, a system comprises memory configured to store at least one of instructions or data and one or more processors operatively coupled to the memory. The one or more processors are configured to receive real-time imagery obtained by a camera located in a vehicle during driving of the vehicle by a driver; analyze at least one image from the real-time imagery to determine a current condition in an external environment around the vehicle; determine, based on the analysis, that the current condition is expected to obscure a selected landmark in the external environment from viewing by the driver; upon determining that the current condition is expected to obscure the selected landmark in the external environment from viewing by the driver, identify a different landmark that is observable by the camera located in the vehicle; and provide a visual, audible or haptic indication of the different landmark to the driver.

The analysis of the at least one image from the real-time imagery to determine the current condition in an external environment around the vehicle may be performed by the one or more processors according to a machine learning process.

According to a further aspect, a computing system comprises one or more processors and a non-transitory computer-readable memory. The memory comprises instructions that, when executed, cause the at least one processor to execute a method as described above.

And according to another aspect, a non-transitory computer-readable storage medium stores instructions that, when executed, cause one or more processors to carry out a method as described above.

BRIEF DESCRIPTION OF THE DRAWINGS

FIGS. 4A-B illustrate a driving scenario in accordance with aspects of the technology.

FIGS. 5A-C illustrate another driving scenario in accordance with aspects of the disclosure.

DETAILED DESCRIPTION

Environmental factors in the vicinity of a vehicle may impact how readily a driver is able to follow displayed or audible driving instructions. Thus, aspects of the technology involve enhancing such instructions with different or additional (e.g., enhanced) visual or audible clues. This may be particularly important in adverse driving conditions, such as when overall visibility is poor, or obstructions may prevent the driver from seeing street signs, business signs or other landmarks. An on-board camera or other imaging device is used by the system to obtain imagery about the external environment, and that information is employed when evaluating whether and how to present enhanced visual and/or audible clues or directions to the driver. By improving the guidance provided to the user, the approach assists the user in the performing the task of controlling vehicle. Concomitant benefits may include more efficient use of vehicle resources and improved road safety.

EXAMPLE VEHICLE SYSTEMS

Figure 1A:
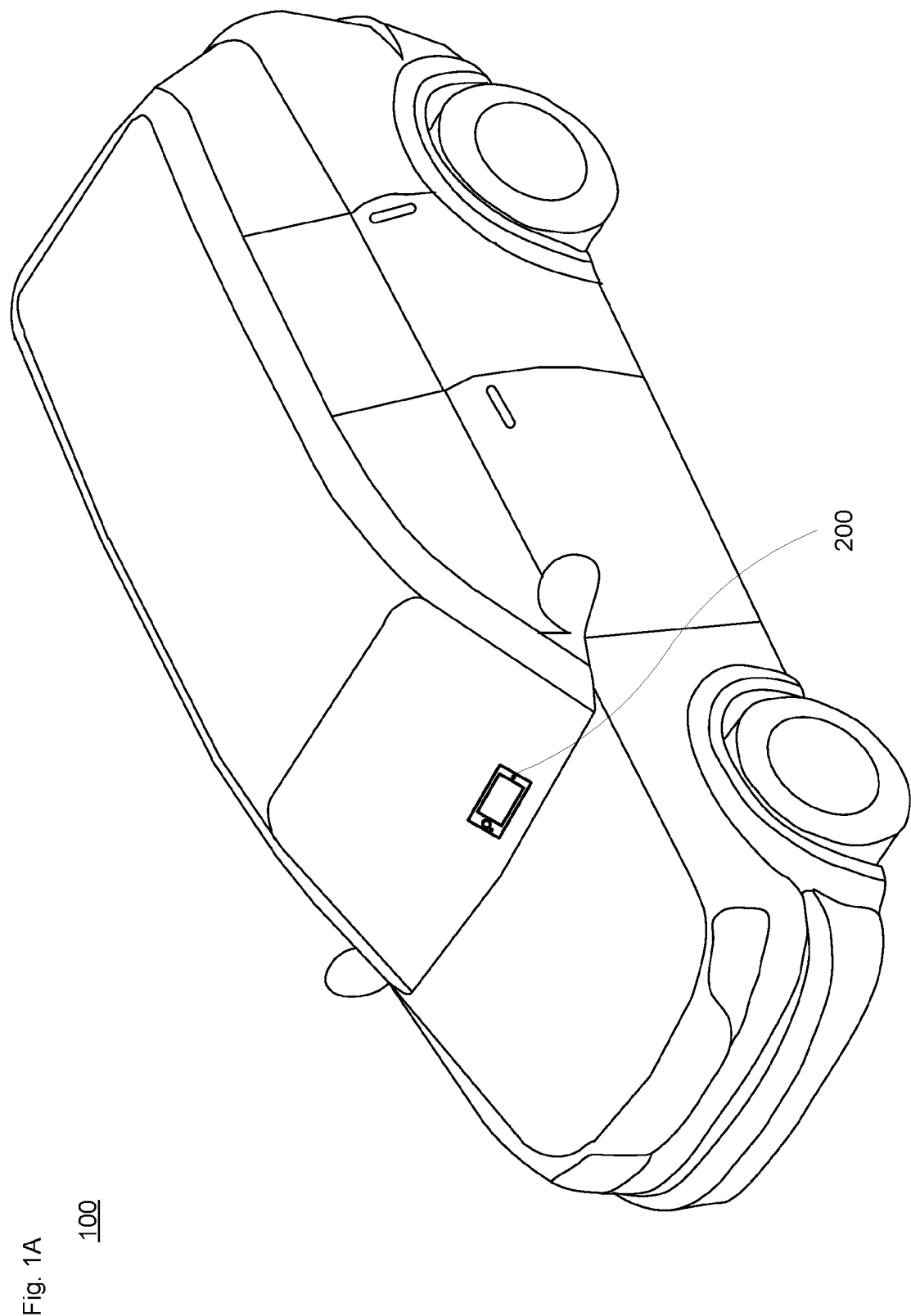
FIG. 1A illustrates an example passenger vehicle for use with aspects of the technology, from an external perspective.
Figure 1B:
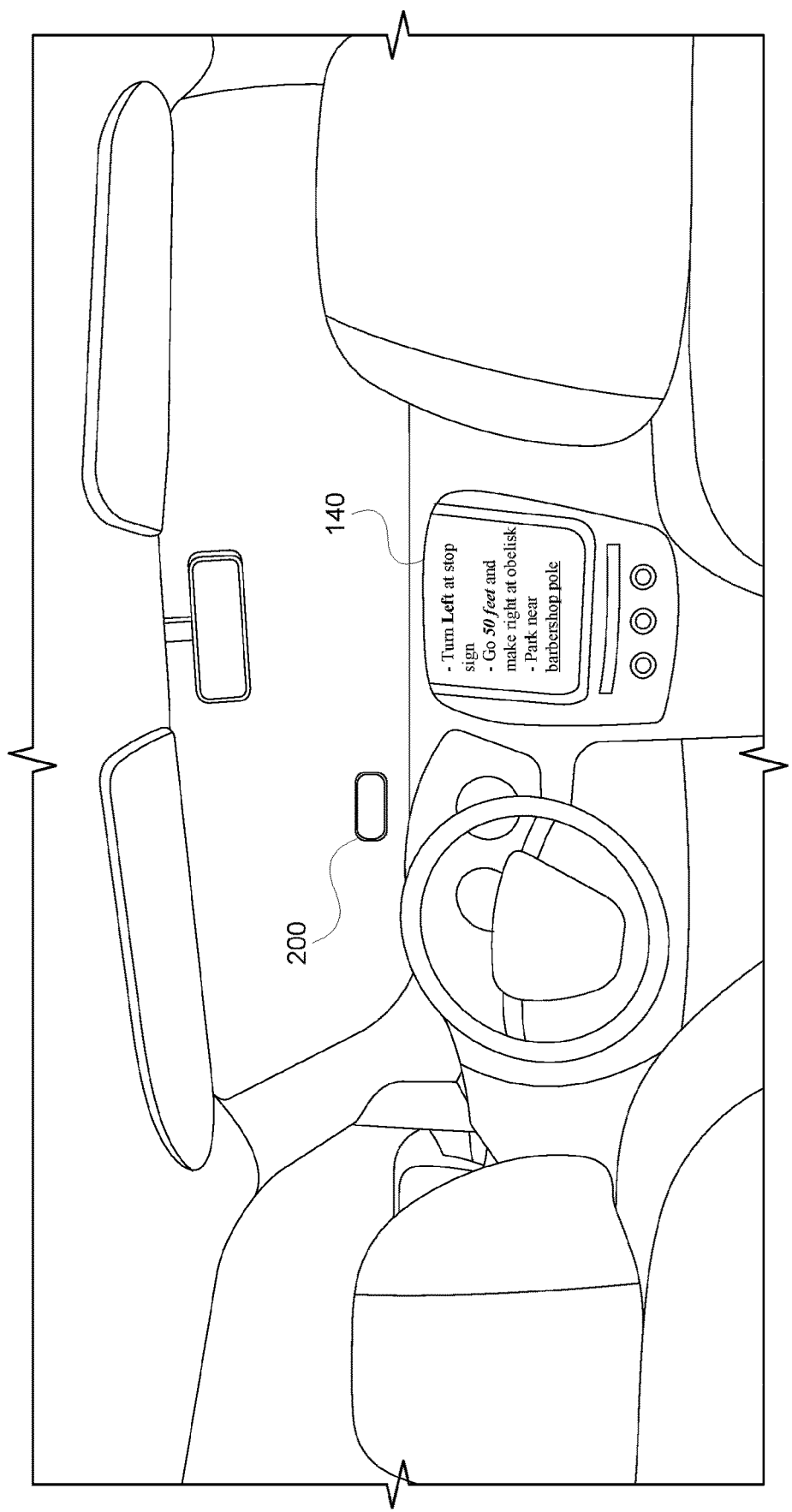
FIG. 1B illustrates the example passenger vehicle of FIG. 1A from an internal perspective.

FIG. 1A illustrates an example passenger vehicle 100 from an exterior viewpoint, and FIG. 1B illustrates the vehicle 100 from an interview viewpoint. As shown in both views, an imaging device 200 is positioned so that one or more image sensors face the environment external to the vehicle. For instance, the imaging device 200 may be arranged within the vehicle to have the same or similar vantage point as the driver, without obstructing the driver's view. By way of example, the imaging device 200 may be placed along the dashboard or interior of the windshield on the driver's side of the vehicle. The vehicle's windshield wipers and/or defroster are designed to keep the windshield clear. Thus, positioning the imaging device 200 in this manner enables still or video images to be captured through the glass.

While certain aspects of the disclosure may be particularly useful in connection with specific types of vehicles, the vehicle may be any type of vehicle including, but not limited to, cars, trucks, motorcycles, buses, recreational vehicles, etc.

Figure 2A:
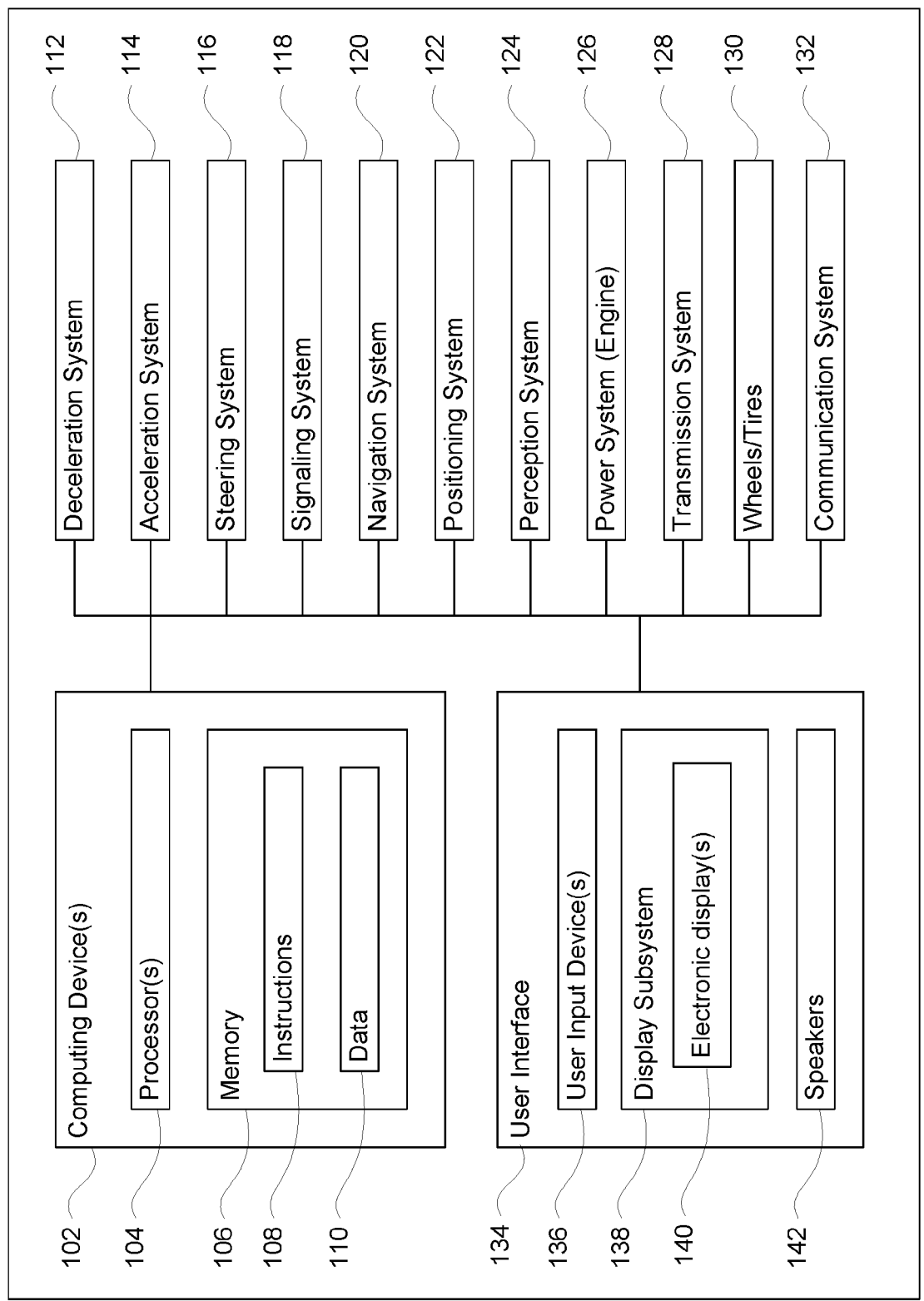
FIG. 2A is a function diagram of an example passenger vehicle in accordance with aspects of the disclosure.

FIG. 2A illustrates a block diagram of various systems of an exemplary passenger vehicle such as vehicle 100 of FIGS. 1A-B. As shown in the block diagram of FIG. 2A, the vehicle includes a control system of one or more computing devices, such as computing devices 102 containing one or more processors 104, memory 106 and other components typically present in general purpose computing devices. The memory 106 stores information accessible by the one or more processors 104, including instructions 108 and data 110 that may be executed or otherwise used by the processor 104. The memory 106 may be of any type capable of storing information accessible by the processor, including a computing device-readable medium. The memory is a non-transitory medium such as a hard-drive, memory card, optical disk, solid-state, tape memory, or the like. Systems may include different combinations of the foregoing, whereby different portions of the instructions and data are stored on different types of media.

The instructions 108 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The data 110 may be retrieved, stored or modified by one or more processors 104 in accordance with the instructions 108. In one example, some or all of the memory 106 may be an event data recorder or other secure data storage system configured to store vehicle diagnostics and/or detected sensor data, which may be on board the vehicle or remote, depending on the implementation.

The one or more processor 104 may be any conventional processors, such as commercially available CPUs. Alternatively, the one or more processors may be a dedicated device such as an ASIC or other hardware-based processor. Although FIG. 2A functionally illustrates the processor(s), memory, and other elements of computing devices 102 as being within the same block, such devices may actually include multiple processors, computing devices, or memories that may or may not be stored within the same physical housing. Similarly, the memory 106 may be a hard drive or other storage media located in a housing different from that of the processor(s) 104. Accordingly, references to a processor or computing device will be understood to include references to a collection of processors or computing devices or memories that may or may not operate in parallel.

In one example, the computing devices 202 may form a driving computing system incorporated into vehicle 100, for instance so that the vehicle may operate in a partially or fully autonomous driving mode. By way of example, a partially autonomous driving mode may be implemented as part of an advanced driver assistance system (ADAS), to provide adaptive cruise control or emergency braking. The driving computing system may capable of communicating with various components of the vehicle. For example, the computing devices 102 may be in communication with various systems of the vehicle, including a driving system including a deceleration system 112 (for controlling braking of the vehicle), acceleration system 114 (for controlling acceleration of the vehicle), steering system 116 (for controlling the orientation of the wheels and direction of the vehicle), signaling system 118 (for controlling turn signals), navigation system 120 (for navigating the vehicle to a location or around objects and/or providing navigation directions to a driver when operating in a manual or partially autonomous driving mode) and a positioning system 122 (for determining the position of the vehicle).

The computing devices 102 are also operatively coupled to a perception system 124 (for detecting objects in the vehicle's environment), a power system 126 (for example, a battery and/or gas or diesel powered engine) and a transmission system 128 in order to control the movement, speed, etc., of the vehicle in accordance with the instructions 108 of memory 106 in a driving mode which does not require or need continuous or periodic input from a passenger of the vehicle. Some or all of the wheels/tires 130 are coupled to the transmission system 128, and the computing devices 102 may be able to receive information about tire pressure, balance and other factors that may impact driving in any of the driving modes.

In certain driving modes such as adaptive cruise control or emergency braking, the computing devices 102 may control the direction and/or speed of the vehicle by controlling various components. The computing devices 102 may navigate the vehicle or aid the driver in navigating the vehicle to a destination location using data from the map information and navigation system 120. Computing devices 102 may use the positioning system 122 to determine the vehicle's location and the perception system 124 to detect and respond to objects when needed to reach the location safely. In order to do so, computing devices 102 may cause the vehicle to accelerate (e.g., by increasing fuel or other energy provided to the engine by acceleration system 114), decelerate (e.g., by decreasing the fuel supplied to the engine, changing gears, and/or by applying brakes by deceleration system 112), change direction (e.g., by turning the front or other wheels of vehicle 100 by steering system 116), and signal such changes (e.g., by lighting turn signals of signaling system 118). Thus, the acceleration system 114 and deceleration system 112 may be a part of a drivetrain or other transmission system 128 that includes various components between an engine of the vehicle and the wheels of the vehicle. Again, by controlling these systems, computing devices 102 may also control the transmission system 128 of the vehicle in order to maneuver the vehicle in a partially (or even fully) autonomous mode.

As an example, computing devices 102 may interact with deceleration system 112 and acceleration system 114 in order to control the speed of the vehicle. Similarly, steering system 116 may be used by computing devices 102 in order to control the direction of vehicle. Signaling system 118 may be used by computing devices 102 or the driver in order to signal the vehicle's intent to other drivers or vehicles, for example, by lighting turn signals or brake lights when needed.

Navigation system 120 may be used by computing devices 102 in order to determine and follow a route to a location. In this regard, the navigation system 120 and/or memory 106 may store map information, e.g., highly detailed maps that computing devices 102 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. The map information may be received from a remote computing system, such as a mapping database, from other vehicles, and/or from previous trips taken by the vehicle 100.

The perception system 124 also includes sensors for detecting objects external to the vehicle. The detected objects may be other vehicles, obstacles in the roadway, traffic signals, signs, trees, etc. For example, the perception system 124 may include one or more light detection and ranging (Lidar) sensors, acoustical (sonar, internal and/or external microphones) devices, radar units, imaging devices such as cameras (e.g., optical and/or infrared), inertial sensors (e.g., gyroscopes or accelerometers), and/or any other detection devices that record data which may be processed by computing devices 102. The sensors of the perception system 124 may detect objects and their characteristics such as location, orientation, size, shape, type (for instance, vehicle, pedestrian, bicyclist, etc.), heading, and speed of movement, etc. The raw data from the sensors and/or the aforementioned characteristics can be sent for further processing to the computing devices 102 periodically and continuously as it is generated by the perception system 124. Computing devices 102 may use the positioning system 122 to determine the vehicle's location and perception system 124 to detect and respond to objects when needed to reach the location safely. In addition, the computing devices 102 may perform calibration of individual sensors, all sensors in a particular sensor assembly, or between sensors in different sensor assemblies.

Also shown in FIG. 2A is a communication system 132. The communication system 132 may include one or more wireless network connections to facilitate communication with other computing devices, such as personal computing devices of the driver and/or passengers within the vehicle, as well as computing devices external to the vehicle such as in another nearby vehicle on the roadway or at a remote network. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

FIG. 2A also illustrates a user interface subsystem 134. The user interface subsystem 134 may include one or more user inputs 136 (e.g., a mouse, keyboard, touch screen or other haptic input, and/or one or more microphones) and one or more display devices of a display subsystem 138 (e.g., a monitor having a screen or any other device that is operable to display information). In this regard, an internal electronic display 140 may be located within a cabin of the passenger vehicle (see FIG. 1B) and may be used by computing devices 102 to provide information to the driver or passengers within the vehicle. Output devices, such as speaker(s) 142 may also be located within the passenger vehicle. As discussed in more detail below, the display(s) 140 and/or speaker(s) 142 are configured to provide enhanced directions or driving cues to the driver when the vehicle is being operated in a manual or partially autonomous driving mode.

Figure 2B:
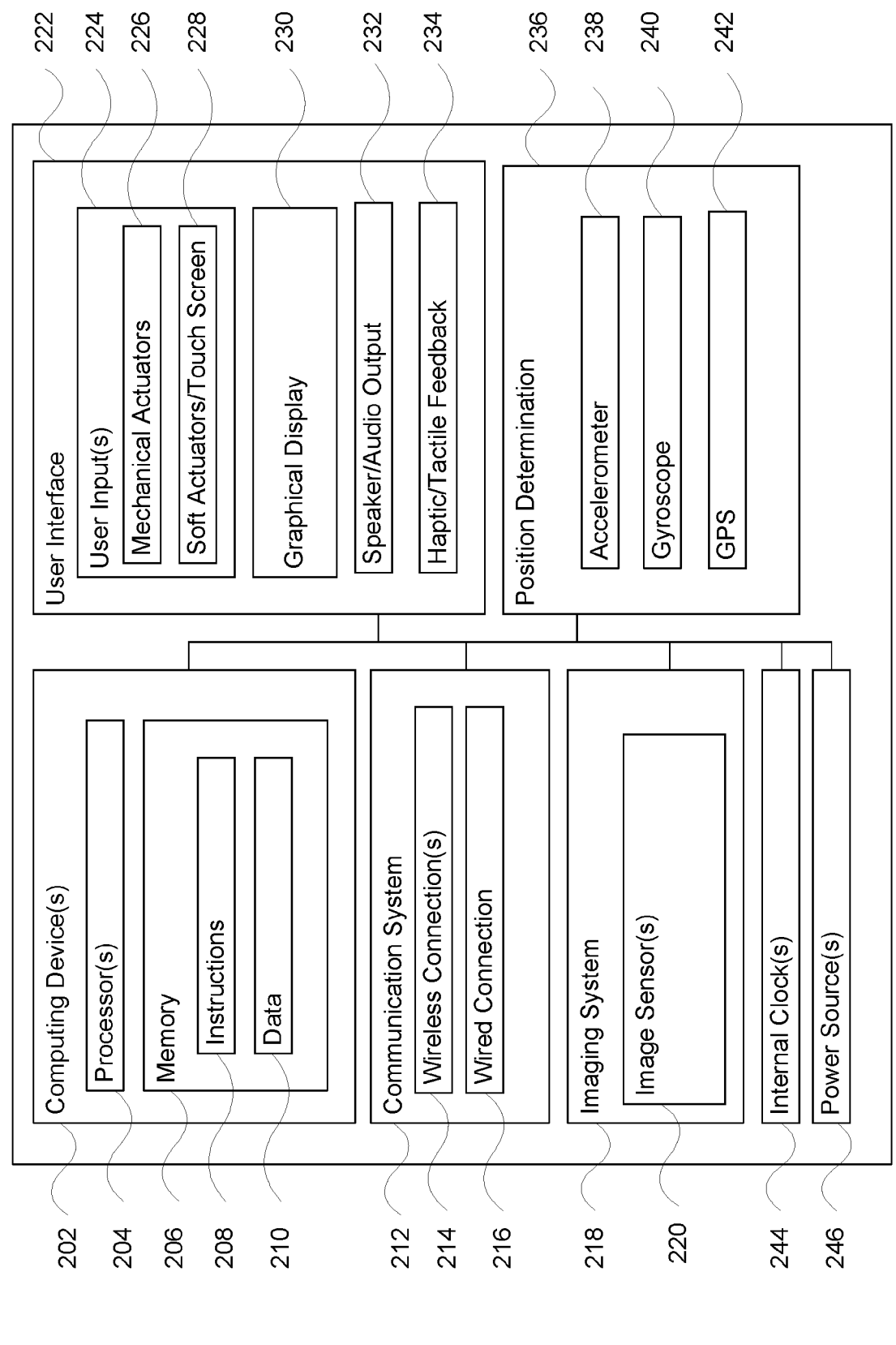
FIG. 2B is an example functional diagram of an imaging device in accordance with aspects of the disclosure.

FIG. 2B illustrates one example of imaging device 200. The imaging device 200 may be part of the on-board perception system 124 of the vehicle. Or, alternatively, the imaging device 200 may be a self-contained or otherwise separate sensor unit. For instance, the imaging device 200 may be the driver's (or a passenger's) mobile phone, or it may be a wearable device (e.g., head-mounted display system, smartwatch, etc.) or other device (e.g., PDA, tablet, etc.) that can be mounted within the interior cabin of the vehicle.

As shown, the imaging device 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 304. The descriptions of the processors, memory, instructions and data from FIG. 2A apply to these elements of FIG. 2B.

In this example, the imaging device 200 also includes a communication system 212, which may have one or both of a wireless connection(s) 214 and a wired connection 216). In this manner, the separate sensor unit is be configured to communicate, either directly or indirectly, with the computing devices 102 or other systems of the vehicle, and/or with a remote system (see FIGS. 3A-B).

The imaging device 200 also includes an imaging system 218 having one or more image sensors 220. By way of example, the image sensors 220 may include one or more sensor devices or arrays of sensor devices configured for optical and/or infrared image capture. The image capture may be done on a frame by frame basis as still images and/or as a series of video images. The one or more image sensors 220 are able to capture images of the environment external to the vehicle, for instance as landscape or panoramic-style images.

The imaging device 200 may also include a user interface subsystem 222 having user inputs 224. The user inputs 224 may comprise one or more mechanical actuators 226 (e.g., switches, buttons and/or dials) and/or one or more soft actuators 228 (e.g., a capacitive or inductive touch screen). The user interface subsystem 222 may also include a graphical display 230, such as a preview screen in order to capture images, a display to view captured images, or both.

Furthermore, the imaging device 200 may include other components, such as a positioning determination subsystem 236. This subsystem 236 may include sensors such as an accelerometer 238, a gyroscope 240 and/or other inertial sensors to help determine the pose or orientation of the imaging device 200. The positioning determination subsystem 236 may also include a GPS unit 242 or other positioning element to determining a latitude/longitude (and elevation) of the imaging device 200. The imaging device 200 may also include one or more internal clocks 244, for instance to obtain timing information for the processors 204, the GPS unit 242, or to generate timestamps for images acquired by the imaging system 218. And a power source (or sources) 246, such as one or more batteries internal to the imaging device 200 or a connection to an external source, may also be provided.

EXAMPLE COLLABORATIVE SYSTEMS

Figure 3A:
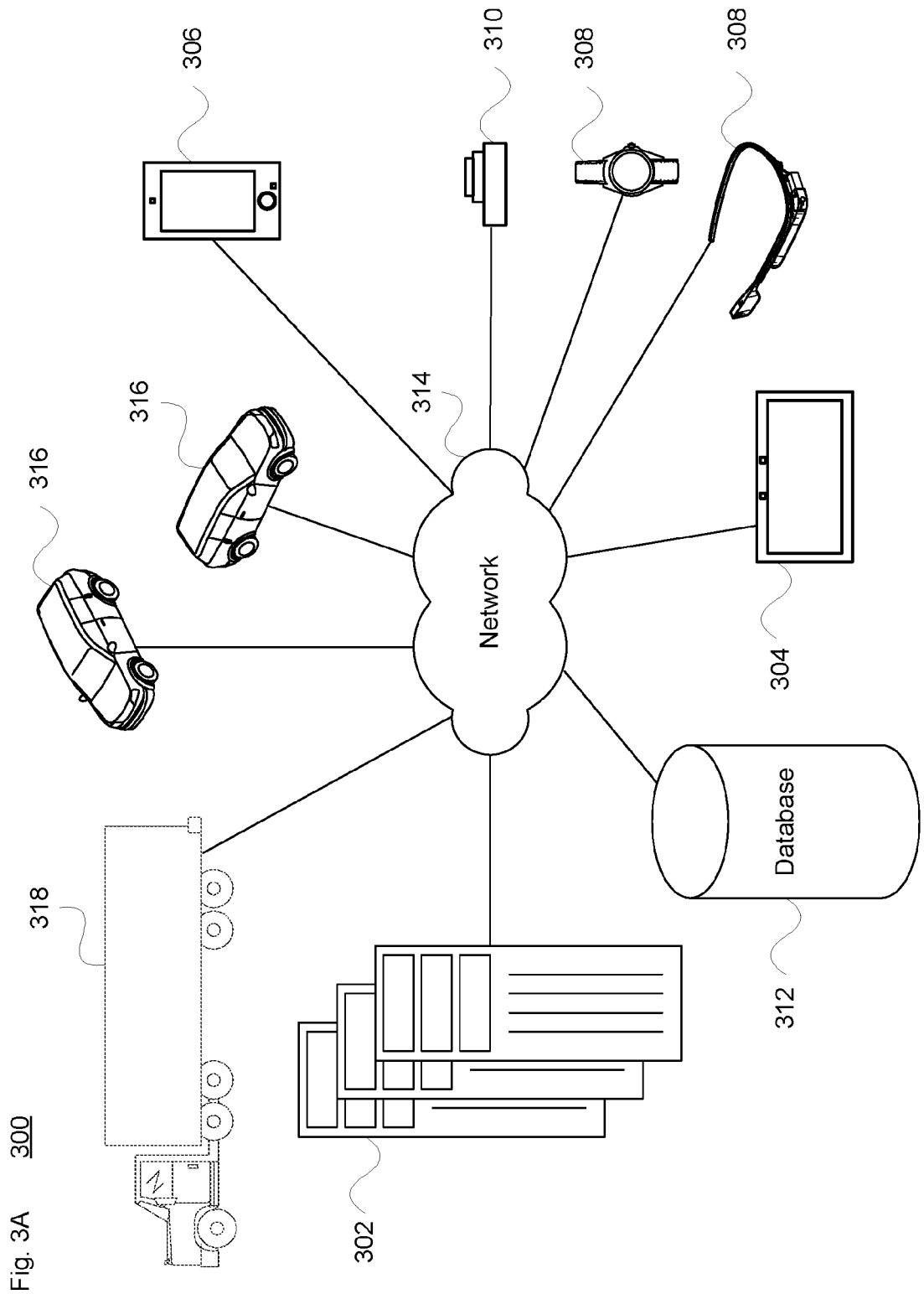
FIGS. 3A-B illustrate an example network of devices in accordance with aspects of the disclosure.
Figure 3B:
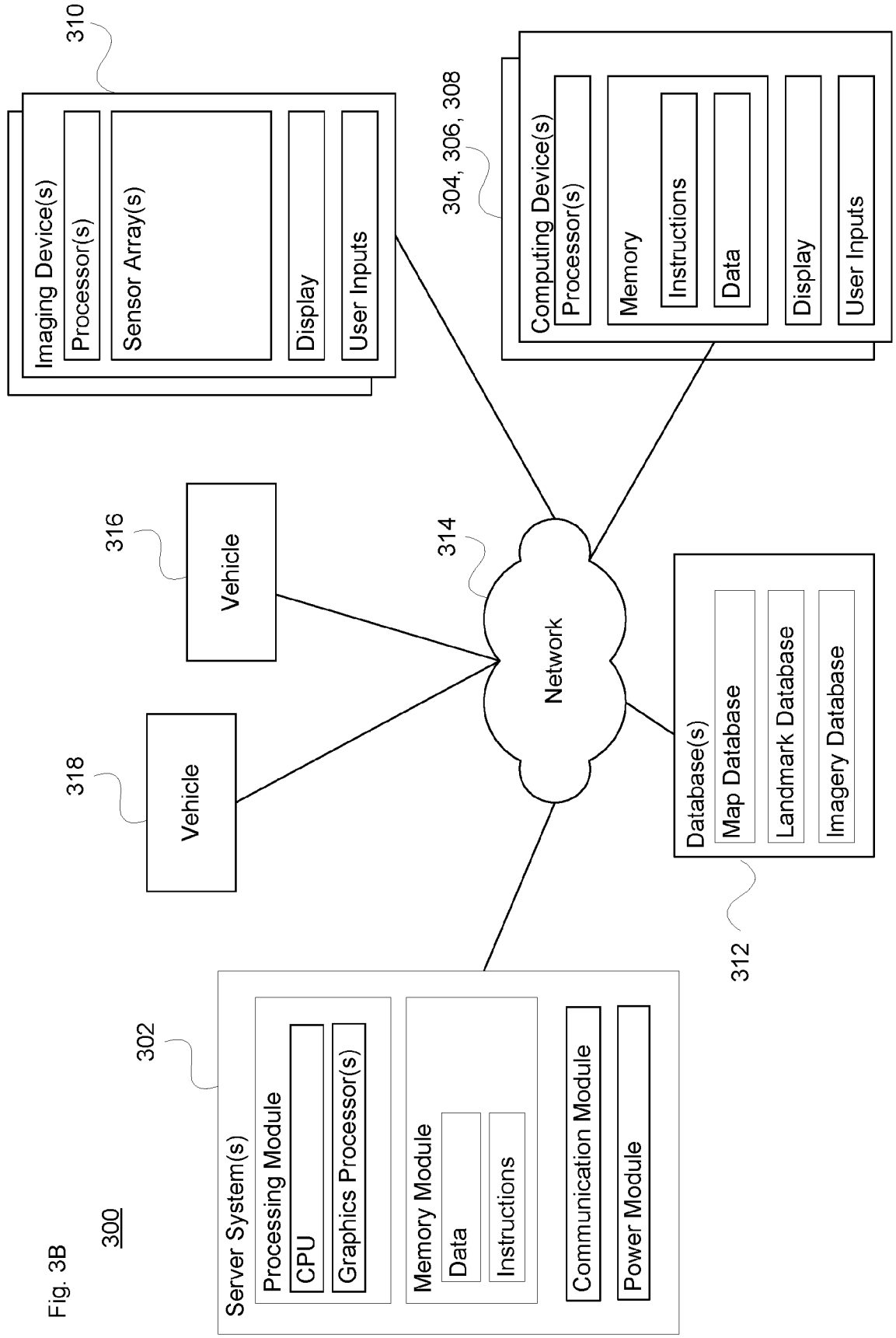

As discussed above, the on-board system may communicate with remote systems (e.g., remote assistance or fleet management), with other vehicles, and/or from various imaging devices within the vehicle. One example of this is shown in FIGS. 3A and 3B. In particular, FIGS. 3A and 3B are pictorial and functional diagrams, respectively, of an example system 300 that includes a plurality of computing devices 302, 304, 306, 308, imaging device 310 and a storage system 312 connected via a network 314. By way of example, the computing device 304 may be a tablet, laptop or netbook computer, and the computing device 306 may be a PDA or mobile phone. The computing devices 308 may be wearable devices such as a smartwatch or head-mounted display (HMD) device. Any of these may include a camera or other imager and may operate as an imaging device 200 such as illustrated in FIG. 2B.

System 300 is also illustrated with vehicles 316 and 318, which may be configured the same as or similarly to vehicle 100 of FIGS. 1A and 1B. For instance, vehicles 316 may be passenger-type vehicles such as sedans or minivans. And vehicle 318 may be a larger vehicle such as a truck, bus, etc. Vehicles 316 and/or 318 may be part of a fleet of vehicles. Although only a few vehicles, computing devices and imaging devices, are depicted for simplicity, such a system may include significantly more elements. As shown in FIG. 3B, each of computing devices 302, 304, 306 and 308 may include one or more processors, memory, data and instructions. Such processors, memories, data and instructions may be configured similarly to the ones described above with regard to FIG. 2A.

The various computing devices and vehicles may communicate via one or more networks, such as network 314. The network 314, and intervening nodes, may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 302 may include one or more server computing devices having a plurality of computing devices, e.g., a load balanced server farm, that exchange information with different nodes of a network for the purpose of receiving, processing and transmitting the data to and from other computing devices. For instance, computing device 302 may include one or more server computing devices that are capable of communicating with the computing devices of vehicles 316 and/or 318, as well as computing devices 304, 306 and 308 via the network 314. For example, vehicles 316 and/or 318 may be a part of a fleet of vehicles that can be dispatched by a server computing device to various locations. In this regard, the computing device 302 may function as a dispatching server computing system which can be used to dispatch vehicles to different locations in order to pick up and drop off passengers or to pick up and deliver cargo. In addition, server computing device 302 may use network 314 to transmit and present information to a user (e.g., a driver) of one of the other computing devices or a passenger of a vehicle. In this regard, computing devices 304, 306 and 308 may be considered client computing devices.

As shown in FIG. 3B each client computing device 304, 306 and 308 may be a personal computing device intended for use by a respective user, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording imagery that may be used for enhanced driving cues as discussed here, speakers, a network interface device, and all of the components used for connecting these elements to one another. See also the discussion of FIG. 2B above for other features and components that may be part of the computing devices.

Storage system 313 can be a database or any type of computerized storage capable of storing information accessible by the server computing devices 302, such as a hard-drive, memory card, ROM, RAM, DVD, CD-ROM, flash drive and/or tape drive. In addition, storage system 313 may include a distributed storage system where data is stored on a plurality of different storage devices which may be physically located at the same or different geographic locations. Storage system 314 may be connected to the computing devices via the network 314 as shown in FIGS. 3A-B, and/or may be directly connected to or incorporated into any of the computing devices.

Storage system 312 may store various types of information. For instance, the storage system 312 may store map, landmark and/or imagery in one or more databases. This information may be retrieved or otherwise accessed by a server computing device, such as one or more server computing devices 302, in order to perform some or all of the features described herein.

For instance, storage system 312 may store map data. This map data may include, for instance, sensor data generated by a perception system, such as the perception system of vehicle 100. The map data may also be map information acquired from various imagery. A landmark database may store information about various landmarks, which may or may not be associated with locations in the map database. For instance, the map database may include street information about New York City, and the landmark database may include information about various places or items of interest (e.g., the Empire State Building). The imagery database may be part of or separate from these databases, and may include previously obtained images about locations in the map and/or landmark databases. The imagery database may include street level or other types of imagery about various locations. One or more of the map, landmark and/or imagery databases may include supplemental information such as street signs, business signs, sculptures or other artwork, etc., which may be visible to a driver along a route. Such information may be accessible, directly or indirectly, by the server system 302, the computing devices 304, 306, 308, and/or imaging devices 310.

EXAMPLE IMPLEMENTATIONS

In view of the structures and configurations described above and illustrated in the figures, various implementations will now be described.

An in-vehicle (or otherwise on-board) camera such as imaging device 200 is configured to detect objects and conditions in the environment adjacent or otherwise nearby the vehicle, such as within line of sight of the front of the vehicle. As noted above, the camera may be positioned within the vehicle, e.g., along the dashboard or inside the windshield, such as adjacent to the rear view mirror or sun visor. In one example, the camera is positioned to provide a field of view similar to or in alignment with what the driver would observe in front of the vehicle while driving. In this manner, the image sensors may be arranged on the camera or positioned within the vehicle cabin to view the roadway in front of the vehicle and adjacent areas, such as to be able to detect street signs, business signs, storefronts, landmarks and other points of interest.

The field of view (FOV) of the camera may be constrained based on the type of imaging device(s) used, placement of the camera within the vehicle and other factors. Still or video images may be acquired. The camera may include a plurality of imaging devices, or multiple cameras may be employed, for instance to provide stereoscopic imaging. For instance, while a single imaging device 200 is illustrated in FIGS. 1A-B, two or more imaging devices 200 may be arranged within the vehicle cabin to provide different fields of view around the vehicle. These imaging devices 200 may communicate with one another or with the vehicle's systems directly or indirectly (e.g., via a Bluetooth™ connection), may communicate with a remote system or service, or with any or all such devices.

While not illustrated in FIG. 2B, the imaging device 200 or other camera may include one or more microphones, or may be operatively coupled to one or more microphones positioned around the vehicle to acquire sounds. Such microphones may be used to detect if the vehicle is driving in snow or rain, for instance based on the sounds of the tires as the vehicle moves along the roadway.

EXAMPLE SCENARIOS

For situations where a driver is driving the vehicle manually or in a partially autonomous mode, he or she may be driving to a destination according to a set of directions along a pre-planned route. The directions may be generated by or downloaded to a personal device such as a mobile phone, PDA, tablet computer, etc., which may or may not include the imaging device 200. Alternatively, the directions may be generated or maintained by the navigation system 120 of the vehicle itself. The directions may instruct the driver to turn onto a particular street, to maneuver for a certain number of feet or meters, to head towards (or away) from certain objects or points of interest, etc.

Unfortunately, real-world conditions and other factors may adversely impact the ability of the driver to follow driving directions. For example, snow, fog, or heavy wind causing swaying vegetation may obscure a street sign. Or a truck or construction equipment may prevent the driver from seeing a landmark. Still further, a driver may encounter issues when he/she needs to make a turn in heavy snow onto a small street with little to no signage visible under the current conditions. Thus, even though a stop sign, stop light or other signage may be nearby, the driver may not be able to see it due to an obstruction (other vehicle, building), inclement weather (e.g., snow, fog, heavy rain) or otherwise poor driving conditions (e.g., at dusk or other low-light condition). The received or previously generated directions may not be sufficient to deal with such factors.

Using image information received from the camera and on-board location information, the system is able to determine current weather conditions (e.g., rain, fog, snow, dusk or nighttime, etc.) and/or road conditions (e.g., changes in surface type, road damage such as potholes, wet or slippery roadways, debris on the road, closures, etc.) in real time. Changes in signage or the obstruction of signs can also be determined based on the imagery captured by the camera. This may be done, for instance, by comparing the captured imagery against previously acquired images of the current location. By way of example, the on-board system may obtain previously acquired images from a remote server, from other vehicles, and/or by previous trips taken by the same vehicle or even by the imaging device itself.

The imaging device 200 is configured to provide the on-board system with a "camera feedback loop" of real-time imagery. During the trip, the system can compare previously obtained imagery against the real-time imagery from the in-vehicle camera. Such image processing may be done by the camera or other device that captured the real-time imagery (e.g., 304, 306, 308 or 310 of FIGS. 3A-B), by the vehicle's on-board computer system (e.g., 102 of FIG. 2A), and/or by a remote server (e.g., server 302 of FIGS. 3A-B). The imagery comparison or difference determination may be shared among different processing devices of the system, for instance according to processing resource availability, communication bandwidth and other factors. Based on the analysis, it is possible to generate information about the difference in the obtained and acquired imagery. Depending on what the differences are (e.g., a street sign is not visible or is partly obscured), the system may identify other visual cues for the driver.

In another example, the on-board system, remote system (e.g., server 302), or both may employ a machine learning model to the real-time acquired images in order to detect the presence and amount of snow, rain, construction equipment, or other types of obstructions and visibility impairments. In this way, the current driving conditions and environment are determined in view of the real-time imagery.

As discussed below, this feedback loop allows the system to caution the driver based on the acquired real-time imagery data. This may be done, for instance, by updating or changing an initial set of driving directions with more detailed instructions based on what can be easily observed versus the normal expected street-by-street navigation mode. The system employs the more verbose instructions to guide the driver to their destination. This can include augmenting instructions with visual clues that are expected or known to provide good orientation on their route. In particular, the system can determine whether and how to enhance the current driving instructions (such as make the instructions more verbose), and to make changes in real time. This, in turn, can make it easier and more likely for the driver to correctly follow the planned route. In addition, the system may vary the route to avoid certain suboptimal conditions.

By way of example, larger, more easily spotted visual guides, such as landmarks, buildings, or various other features of the urban landscape (parks, billboards, lamp posts, etc.) can be used to provide better orientation to the driver and tell him/her when to make the turn. The result is a more verbose set of instructions, such as "Turn left on 15th St., after a large billboard on your right" or "Begin slowing down near the tall brown building on your right, and prepare to turn right before the next such tall building," assuming of course that in the latter example these two buildings stand out from the rest. These instructions may be presented visually, such as on display 140 of the vehicle, graphical display 230 of the imaging device 200, etc. Here, visual cues such as a larger font, different colors and/or highlighting may be employed.

The instructions may also be presented audibly, such as by the speaker(s) 142 of the vehicle's user interface 134, or by speaker 232 of the imaging device 200. In addition or alternatively, haptic feedback (e.g., through the steering wheel) may also help provide enhanced updated guidance to the driver, such as by vibrating the steering wheel in a manner to indicate a right or left turn.

Another aspect of the technology involves a likelihood that a driver will correctly follow the provided navigation instructions in view of the current environmental conditions. This likelihood may be based on prior navigation situations involving the same driver, aggregated (and anonymized) statistical information for other drivers at the same or similar locations, and/or under the same or similar conditions, the types of landmark information available at the current location, and other factors. Such information may be used to calibrate the system and/or to select additional (verbose) feature clues for the driver.

For instance, the system may analyze individual user deviations (e.g., the driver fails to follow initial set of instructions correctly) and how these deviations come up in different situations, as well as the individual's driving habits. Any person-specific information may be stored on the user's device and only used when determining whether to fetch the regular or "enhanced" series of instructions.

As part of this approach, the system may analyze not only individual failures to follow the route, but failures in the aggregate. Thus, if the driver misses multiple turns while driving, or if the system is made aware that several drivers along the route are missing turns, more verbose visual and/or audible (and haptic) cues can be provided to the driver. In another example, if the system detects that the driver is slowing down in an area where this is not expected, e.g., in the middle of a straight line segment of the route, this may also indicate that the driver is having difficulty following the original directions. For instance, it may be because it is hard to read the street signs at night or in the snow, or the roadway is icy or snowy, etc.

Depending on the scenario, this approach could involve accumulating information over time. By way of example, an explicit conditions-dependent model of visibility could be developed based on evidence from the camera and/or other devices. Here, if the system detects that it has been snowing for some amount of time, e.g., 15 minutes, an hour, etc., the system may select different or additional cues to aid the driver.

Furthermore, even if a sign or other landmark is not obscured due to the weather or poor lighting, it may be difficult to see, such as due to the curvature of the roadway or temporary obstacles such as trucks and other large vehicles. In this case, an audible cue may be presented to aid the driver when the camera feedback loop analysis suggests that the driver may have trouble with the directions.

One way to aid the driver with verbose clues involves first understanding what types of landmarks are present in the environment. For instance, this can involve analysis of publicly available street-level imagery (e.g., Google Street View panoramas and other publicly available imagery). Image content analysis systems can detect a large variety of urban features and various properties of such features (shape, color, size), as well as combinations of semantic features (e.g., "a mural on the north-facing wall of a tall tower block").

For instance, the system may obtain image information for particular locations along the planned route from a remote server or other vehicles. The amount of information obtained can depend on the robustness of the wireless communication link. Or, alternatively, the driver's (or passenger's) personal device may download imagery before starting the trip. Content updates may be provided as needed, or as available, during the trip. Other information, such as weather, traffic and emergency notifications can also be obtained from external sources, including from other vehicles.

All of this information can be analyzed and/or combined as factors for the system to use when deciding whether or how to provide verbose, enhanced direction information.

Figure 4B:
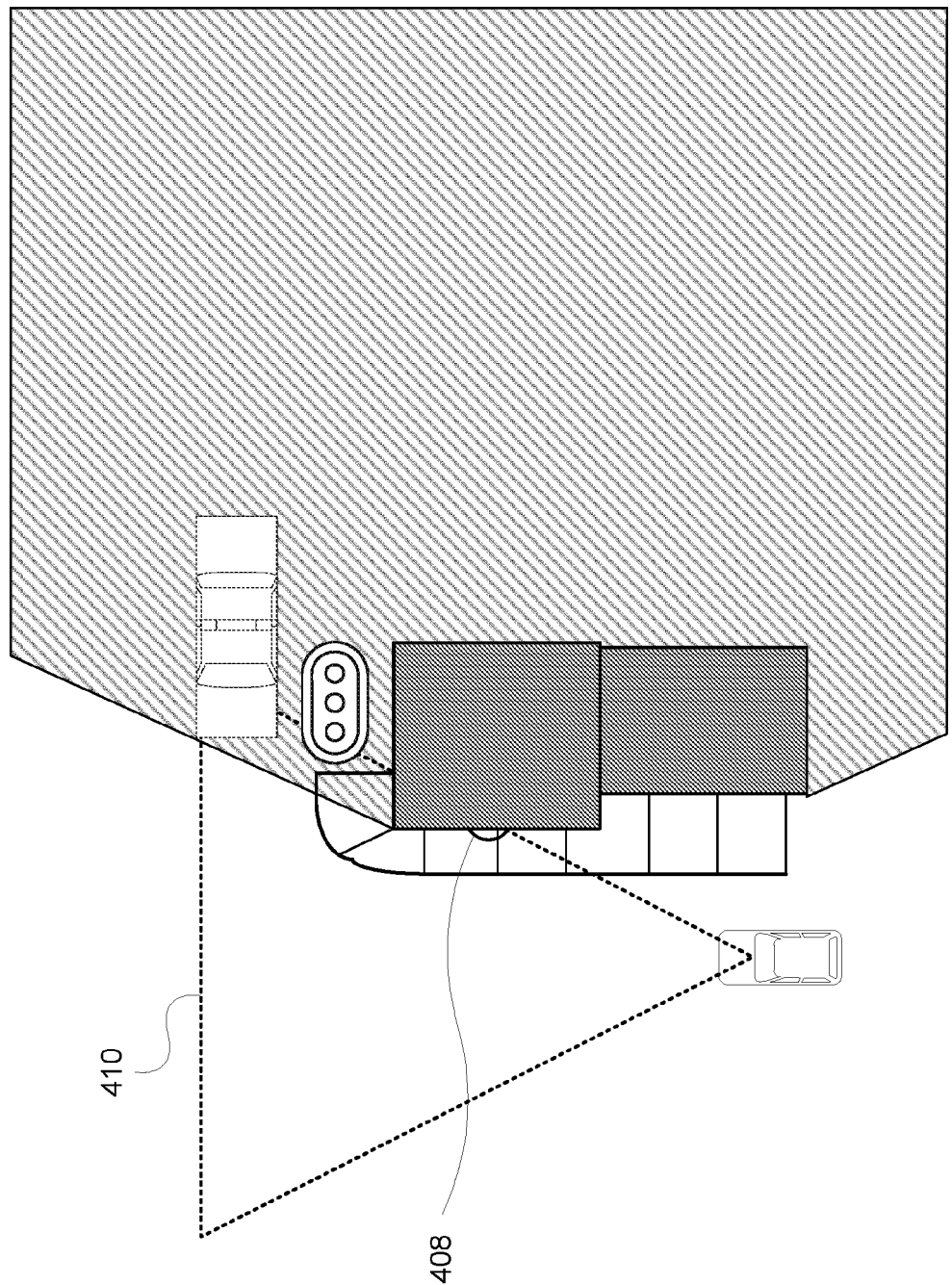

FIGS. 4A-B illustrate one scenario 400, in which typical direction information may be obscured or otherwise hard to detect. For instance, as shown in FIG. 4A, the driver may be driving a vehicle 100 along the road and following pre-generated directions. However, the Main Street street sign 402 may be obscured by building 404. And business sign "Joe's Barber Shop" 406 may be hard to see due to snow, rain or a low-light condition. However, there is another landmark associated with the barber shop or otherwise located nearby, which is barbershop pole 408 on building 404.

As shown in the top-down view of FIG. 4B, the in-vehicle imaging device 200 may have a field of view 410. The field of view 410 may be similar to the driver's viewpoint of the roadway. Here, by image comparison, machine learning and/or any of the other approaches discussed herein the system can determine from the acquired real-time images of the imaging device that the street sign is obscured and the conditions may be too degraded for the driver to see the business sign. However, the images captured by the imaging device 200 may readily identify the barbershop pole 408, which may be on or off. This additional landmark may be determined by the system to provide a more visible point of interest. As a result, the driving directions may be modified or an additional cue may be visually or audibly presented to the driver, e.g., to park near the barbershop pole (see FIG. 1B). Such verbose augmentation may be performed by the imaging device 200, the vehicle's computing devices 102 and/or navigation system 120, or by remote server 302 (or a combination thereof).

Figure 5B:
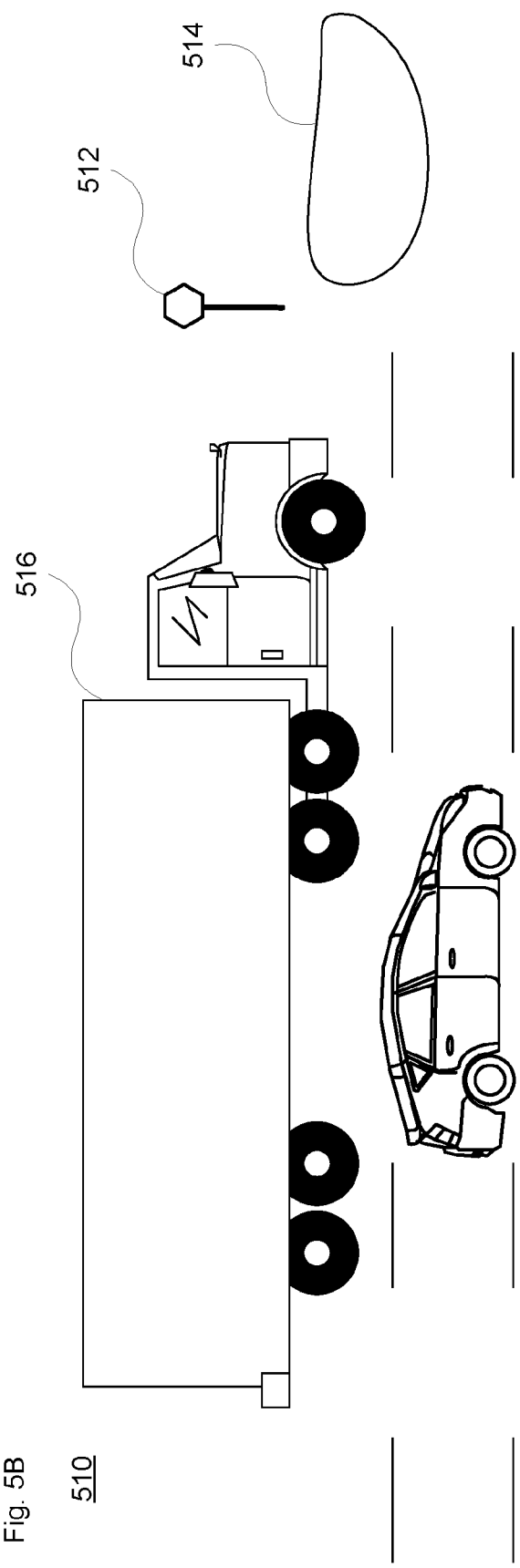
Figure 5C:
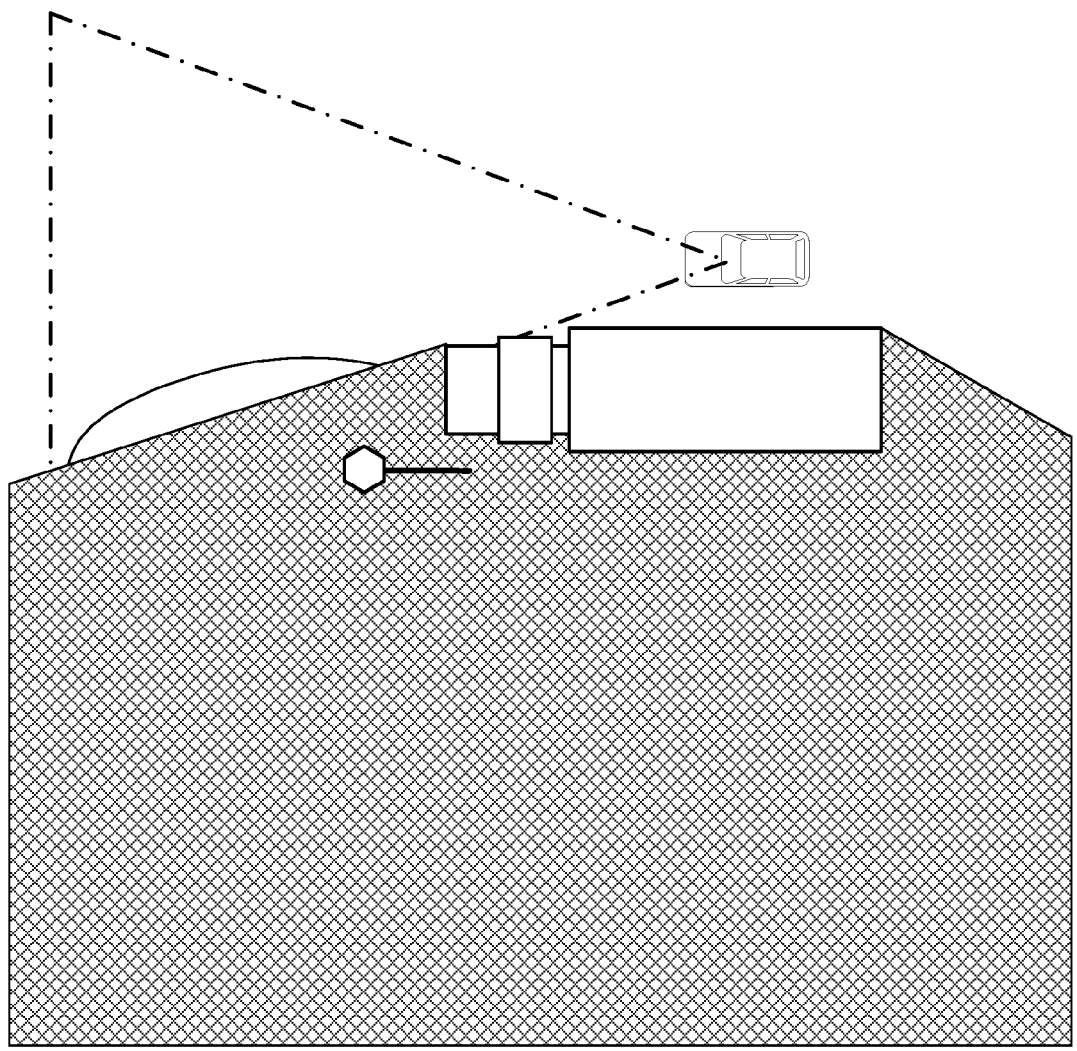

FIGS. 5A-C illustrate another scenario in which the driver's field of view may be limited or obscured. For instance, FIG. 5A illustrates a field of view range 500. This figure shows that, under good conditions, the driver may have an unobscured field of view 502 towards the front of the vehicle of 200 feet or meters, or more. As shown in driving scenario 510 of FIG. 5B, while driving down the roadway, there may be an object such as a stop sign 512 located adjacent to an intersection. There may also be a puddle or patch of ice 514 along a portion of the roadway in front of the vehicle. However, there may also be a large truck 516 in the next lane. And as shown by the top-down view 520 of FIG. 5C, the sign and at least a portion of the puddle or ice patch may be obscured from the driver's field of view by the truck. The puddle or ice patch may also be obscured by heavy rain, snow, etc. Nonetheless, using the techniques discussed herein, the imagery obtained from the on-board imaging device can be employed to identify whether visibility has been reduced or an expected object (e.g., the stop sign) is not in the driver's field of view. Based on this, the system may provide enhanced or alternative directions or other instructions, such as performing a particular driving action. This may involve changing lanes or otherwise altering the route. Examples of specific driving actions include slowing down, turning, stopping or parking. It may also involve visually, audibly or haptically providing information about other landmarks to help the driver proceed to the desired destination.

EXAMPLE METHOD

Figure 6:
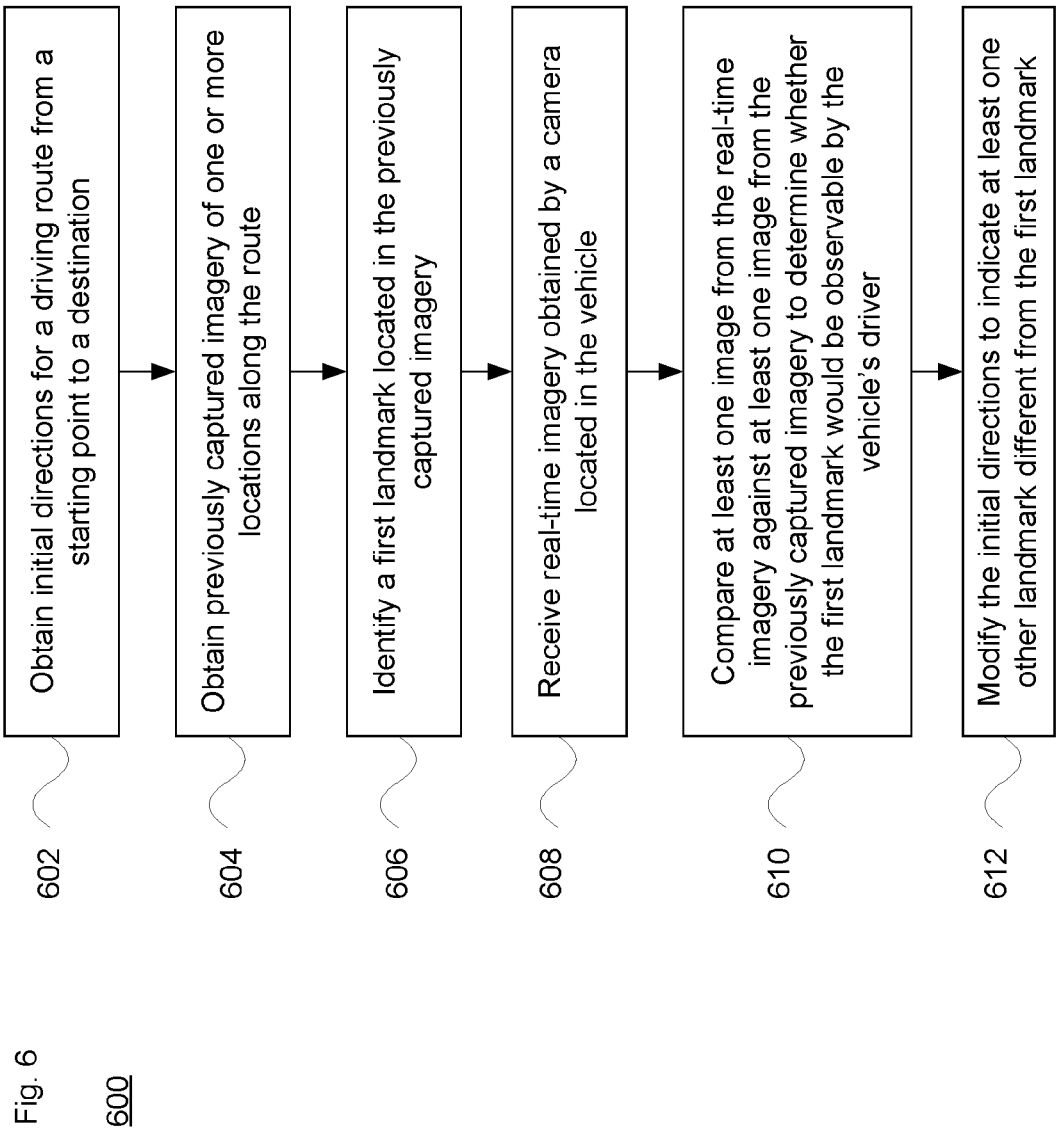
FIG. 6 illustrates an example method in accordance with aspects of the disclosure.

FIG. 6 illustrates an example 600 of a method for modifying driving directions. For instance, as shown in block 602, initial directions are obtained for a driving route for a driver of a vehicle. The directions are used for routing the vehicle from a starting point to a destination. At block 604, previously captured imagery is obtained of one or more locations along the route. This may come from, e.g., an imagery database of a remote system, another vehicle, or images previously obtained by the current vehicle or by an imaging device being used with the vehicle. At block 606, the process identifies a first landmark located in the previously captured imagery. The processes of blocks 602, 604 and 606 may be performed in a different order or in parallel. Any or all of them may be done prior to driving of the vehicle by the driver, or while the vehicle is in route to the destination.

At block 608, real-time imagery obtained by a camera located in the vehicle is received. It may be received by one or more processors of the camera, of the vehicle, and/or of a remote system such as server system 302. At block 610, at least one image from the real-time imagery is compared against at least one image from the previously captured imagery to determine whether the first landmark would be observable by the driver of the vehicle. For example, the images may be compared to assess relative properties associated with the observability of the first landmark, such as assessing the relative brightnesses of the images and/or other image characteristics. Image characteristics may include semantic content such as objects identified from the image or current conditions in the external environment. This is desirably done in real time while the vehicle is being driven. Then, at block 612, upon a determination that the first landmark would not be observable by the driver of the vehicle, the initial directions for the driving route are modified to indicate at least one other landmark different than the first landmark. In this way, robust information is able to be provided to the driver in order to effectively assist the driver in maneuvering the vehicle to the destination.

Figure 7:
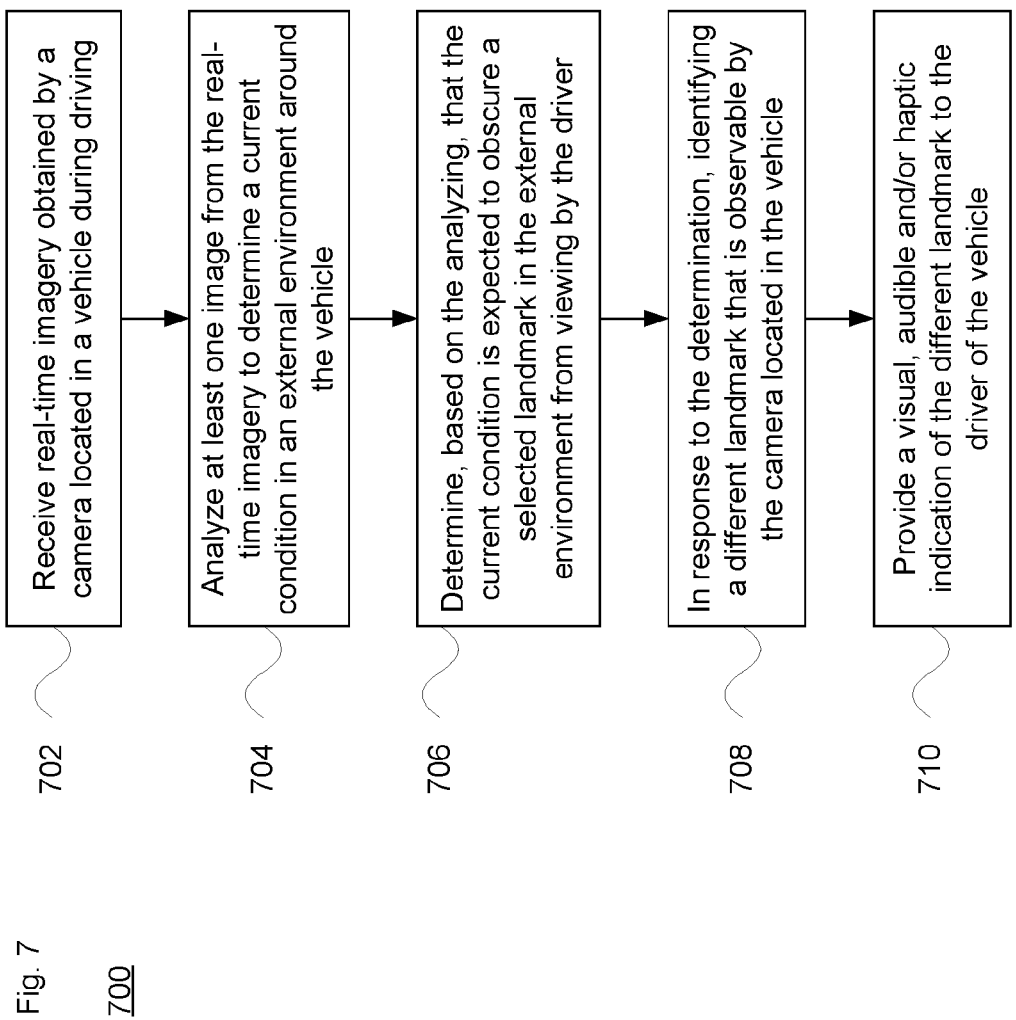
FIG. 7 illustrates another example method in accordance with aspects of the disclosure.

FIG. 7 illustrates an example 700 of a method for providing updated or augmented direction information to the driver of a vehicle. In block 702, the process receives real-time imagery obtained by a camera located in a vehicle. The real-time imagery is obtained during driving of the vehicle by the driver. At block 704, at least one image from the real-time imagery is analyzed to determine a current condition in an external environment around the vehicle. This analysis may be done, for example, by one or more processors of the camera, of the vehicle, and/or of a remote server system such as server system 302. Current conditions may include but are not limited to weather conditions and/or the time of day. At block 706, the system determines, based on the analysis, that the current condition is expected to obscure a selected landmark in the external environment from viewing by the driver. For example, each landmark may be associated with conditions under which the landmark is considered to be obscured (e.g. an unlit street sign may be considered obscured at night). In order to avoid such a problematic situation, at block 708 it is explained that upon determining that the current condition is expected to obscure the selected landmark in the external environment from viewing by the driver, the system identifies a different landmark that is observable by the camera located in the vehicle. The different landmark may be currently observable in real-time, or may be observable in the near future, e.g., in the next 5-10 seconds or no more than a minute, within 1-3 blocks, etc. Based on this information, at block 710 a visual, audible and/or haptic indication of the different landmark is provided to the driver.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

As noted above, one beneficial area of the technology is for inclement weather. By way of example, the system may provide targeted lane guidance, such as when snow covers or closes one lane of traffic. Here, the directions may be changed to identify a different exit or turn-off point. The system is also suitable for other less-than-optimal conditions. For instance, a particular street sign may not be visible at night on an unlit residential street.

Other benefits may involve the ability to provide verbose modified instructions for factors other than those involving external environmental conditions. For instance, as noted above, the system may evaluate how closely the driver is able to follow the driving instructions. In view of this, alternative factors may include the complexity of the directions, numerous turns close together in time or in distance, etc. Any or all of this information may be used to provide updated or augmented instructions or cues to the driver in real time, in order to increase the likelihood that he or she will be able to effectively follow the driving directions to the desired destination.

The technology is also vehicle form-factor agnostic. Similar approaches can be applied to passenger vehicles, buses, motorcycles, light and heavy trucks, construction equipment, etc.

The invention claimed is:

1. A method comprising:

obtaining initial directions for a driving route for a driver of a vehicle, the directions for use in routing the vehicle from a starting point to a destination, the initial directions including an indication of a first landmark;

obtaining previously captured imagery of one or more locations along the route;

identifying the first landmark located in the previously captured imagery;

receiving, by one or more processors of a computer device, real-time imagery obtained by a camera located in the vehicle;

receiving, by the one or more processors, real-time non-verbal audio input obtained by a microphone located in the vehicle;

comparing, by the one or more processors in real-time at the time the real-time imagery was received, at least one image from the real-time imagery against at least one image from the previously captured imagery to determine whether the first landmark would be observable by the driver of the vehicle;

determining, by the one or more processors, in real-time, based on the comparing and the received real-time non-verbal audio input, that the first landmark would be obscured from a viewpoint of the driver of the vehicle;

identifying, by the one or more processors in response to determining that the first landmark would be obscured, at least one second landmark from the real-time imagery, the at least one second landmark being different than the first landmark and observable from the viewpoint of the driver of the vehicle;

modifying, by the one or more processors in real-time, prior to providing the indication of the first landmark in the initial directions as output to the driver, the initial directions for the driving route to replace the indication of the first landmark with an indication of the at least one second landmark;

analyzing, by the one or more processors, aggregated driver information to determine whether the driver is likely to correctly follow the modified driving directions; and selecting additional verbal or audible cues to provide for output with the modified driving directions based on whether the driver is likely to correctly follow the modified driving directions.

2. The method of claim 1, wherein determining whether the first landmark is obscured includes determining that visibility of the first landmark is adversely impacted by a weather condition, a low light condition, another vehicle, a building or vegetation.

3. The method of claim 1, wherein the modified directions indicate to the driver to take a specific driving action when the at least one second landmark is visible to the driver.

4. The method of claim 3, wherein the specific driving action is selected from a group consisting of slowing down, turning, stopping or parking.

5. The method of claim 1, wherein modifying the initial directions includes at least one of updating a graphical display within the vehicle or playing audible instructions within the vehicle.

6. The method of claim 1, wherein the camera located in the vehicle has a field of view, and comparing the at least one image from the real-time imagery against the at least one image from the previously captured image includes evaluating the camera's field of view against an expected field of view of the driver.

7. The method of claim 1, wherein modifying the initial directions further includes augmenting or replacing the initial directions with at least one visual clue based on one or more objects along the driving route visible to the camera.

8. A method comprising:
  receiving, by one or more processors of a computer device, real-time imagery obtained by a camera located in a vehicle during driving of the vehicle by a driver;
  receiving, by the one or more processors, real-time non-verbal audio input obtained by a microphone located in the vehicle during driving;
  analyzing, by the one or more processors in real-time, at least one image from the real-time imagery and the real-time non-verbal audio input to determine a current condition in an external environment around the vehicle;
  determining, by the one or more processors in real-time after the analysis and based on the real-time imagery and the real-time non-verbal audio input, that the current condition is expected to at least partially obscure a selected landmark in the external environment from viewing by the driver;
  upon determining that the current condition is expected to at least partially obscure the selected landmark in the external environment from viewing by the driver, identifying, by the one or more processors in real-time based on the real-time imagery, a different landmark that is currently observable by the camera located in the vehicle, the identifying comprising selecting the different landmark from the real-time imagery;
  determining, by the one or more processors, a likelihood that the driver will correctly follow navigation instructions based on the current condition; and
  providing a visual, audible or haptic indication of the different landmark to the driver, wherein the visual, audible, or haptic indication is augmented with additional cues when it is determined that the driver is not likely to correctly follow the navigation instructions.

9. The method of claim 8, further comprising prior to the providing, modifying an initial set of directions for driving to a destination with the indication of the different landmark.

10. The method of claim 9, wherein the modified initial directions indicate to the driver to take a specific driving action when the different landmark is visible to the driver.

11. The method of claim 10, wherein the specific driving action is selected from a group consisting of slowing down, turning, stopping or parking.

12. The method of claim 8, wherein determining that the current condition is expected to at least partially obscure the selected landmark in the external environment from viewing by the driver includes determining that visibility of the selected landmark is adversely impacted by a weather condition, a low light condition, another vehicle, a building or vegetation.

13. The method of claim 8, wherein analyzing the at least one image from the real-time imagery to determine the current condition in the external environment around the vehicle comprises applying a machine learning model to the real-time imagery in order to detect an obstruction or other visibility impairment in the external environment.

14. A system comprising:
  memory configured to store at least one of instructions or data; and
  one or more processors operatively coupled to the memory, the one or more processors being configured to:
    obtain initial directions for a driving route for a driver of a vehicle, the directions for use in routing the vehicle from a starting point to a destination, the initial directions including an indication of a first landmark;
    obtain previously captured imagery of one or more locations along the route;
    identify the first landmark located in the previously captured imagery;
    receive real-time imagery obtained by a camera located in the vehicle;
    receive real-time non-verbal audio input obtained by a microphone located in the vehicle;
    compare, in real-time at the time the real-time imagery was received, at least one image from the real-time imagery against at least one image from the previously captured imagery to determine whether the first landmark would be observable by the driver of the vehicle;
    determine, in real-time based on the comparing and the received real-time non-verbal audio input, that the first landmark would be obscured from a viewpoint of the driver of the vehicle;
    identify, in response to determining that the first landmark would be obscured, at least one second landmark from the real-time imagery, the at least one second landmark being different than the first landmark and observable from the viewpoint of the driver of the vehicle;
    modify, in real-time prior to providing the indication of the first landmark in the initial directions as output to the driver, the initial directions for the driving route to replace the indication of the first landmark with an indication of the at least one second landmark;
    analyze aggregated driver information to determine whether the driver is likely to correctly follow the modified driving directions; and
    select additional verbal or audible cues to provide for output with the modified driving directions based on whether the driver is likely to correctly follow the modified driving directions.

15. The system of claim 14, further comprising the camera.

16. The system of claim 14, wherein the camera is part of a personal communication device.

17. A system comprising:
  memory configured to store at least one of instructions or data; and
  one or more processors operatively coupled to the memory, the one or more processors being configured to:

receive real-time imagery obtained by a camera located in a vehicle during driving of the vehicle by a driver;

receive real-time non-verbal audio input obtained by a microphone located in the vehicle during driving analyze, in real-time, at least one image from the real-time imagery and the real-time non-verbal audio input to determine a current condition in an external environment around the vehicle;

determine, in real-time after the analysis and based on the real-time imagery and the real-time non-verbal audio input, that the current condition is expected to at least partially obscure a selected landmark in the external environment from viewing by the driver;

upon determining that the current condition is expected to at least partially obscure the selected landmark in the external environment from viewing by the driver, identify, in real-time based on the real-time imagery, a different landmark that is currently observable by the camera located in the vehicle, the identifying comprising selecting the different landmark from the real-time imagery;

determine a likelihood that the driver will correctly follow navigation instructions based on the current condition; and provide a visual, audible or haptic indication of the different landmark to the driver, wherein the visual, audible, or haptic indication is augmented with additional cues when it is determined that the driver is not likely to correctly follow the navigation instructions.

18. The system of claim 17, wherein the analysis of the at least one image from the real-time imagery to determine the current condition in an external environment around the vehicle is performed by the one or more processors according to a machine learning process.

19. The method of claim 1, further comprising selecting additional visual or audible clues indicating the at least one second landmark based on deviations of the driver from previous route instructions.

20. The method of claim 1, further comprising selecting additional visual or audible clues indicating the at least one second landmark based on aggregated deviations of a plurality of drivers from previous route instructions including the at least one second landmark.

21. The method of claim 8, wherein determining the likelihood that the driver will correctly follow navigation instructions based on the current condition comprises:

analyzing the driver's deviations from prior instructions; and analyzing other driver's deviations from prior instructions.

22. The method of claim 1, further comprising:

determining, by the one or more processors based on at least one of the real-time imagery or the real-time non-verbal audio input, whether a field of view of the driver is obscured; and when the field of view is obscured, providing, by the one or more processors, instructions, wherein the instructions include at least one of enhanced directions, alternative directions, or a driving action, and wherein when the instructions include the driving action, the driving action includes at least one of a lane change, slowing down, speeding up, turning, stopping, or parking.

* * * * *